(12) United States Patent
Yonezawa

(10) Patent No.: US 9,892,195 B2
(45) Date of Patent: Feb. 13, 2018

(54) PROVIDING INFORMATION VIA A NETWORK

(75) Inventor: Takashi Yonezawa, Yomato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3744 days.

(21) Appl. No.: 11/215,432

(22) Filed: Aug. 30, 2005

(65) Prior Publication Data
US 2006/0059141 A1 Mar. 16, 2006

(30) Foreign Application Priority Data
Aug. 30, 2004 (JP) ................... 2004-249896

(51) Int. Cl.
*G06F 17/30* (2006.01)
*G06Q 30/02* (2012.01)

(52) U.S. Cl.
CPC ....... *G06F 17/30864* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 6,438,579 B1* | 8/2002 | Hosken | 709/203 |
| 6,636,836 B1* | 10/2003 | Pyo | 705/26 |
| 6,912,575 B1* | 6/2005 | Swift et al. | 709/226 |
| 2002/0138831 A1* | 9/2002 | Wachtfogel et al. | 725/32 |
| 2003/0106057 A1* | 6/2003 | Perdon | 725/45 |
| 2004/0153373 A1* | 8/2004 | Song et al. | 705/26 |
| 2004/0225509 A1* | 11/2004 | Andre | 705/1 |
| 2007/0106656 A1* | 5/2007 | Gutta, Sr. | 707/5 |

FOREIGN PATENT DOCUMENTS

| | | | |
|---|---|---|---|
| JP | 07-056929 | 3/1995 | |
| JP | 01229285 | 8/2001 | G06F 17/60 |
| JP | 2001-338203 | 12/2001 | |

(Continued)

*Primary Examiner* — Thu Nga Nguyen
(74) *Attorney, Agent, or Firm* — Cuenot, Forsythe & Kim, LLC

(57) ABSTRACT

An efficient method and system is provided for promptly providing recommended information on a product or service giving consideration to a site user trend. It comprises a recommended information providing server for managing information on users and user terminals used by users to access the recommended information providing server. The recommended information providing server has an information management section for managing transmission network information for specifying a channel for transmitting information among the plurality of user terminals. The transmission network information includes settings of users similar in trends to a target user as virtual users. Upon receiving event information (e.g., purchase of product A) from a user terminal of a user set as a virtual user, the recommended information providing server references the transmission network information, specifies a destination (target user) of the recommended information, and sends the recommended information to a user terminal of the destination via a user agent section.

15 Claims, 5 Drawing Sheets

(56) References Cited

FOREIGN PATENT DOCUMENTS

| | | |
|---|---|---|
| JP | 2002-251354 | 9/2002 |
| JP | 2002-251567 | 9/2002 |
| JP | 2003-078656 | 3/2003 |
| JP | 2003-122992 | 4/2003 |
| JP | 2003-141149 | 5/2003 |
| JP | 2003-250146 | 9/2003 |
| JP | 2003-345959 | 12/2003 |
| JP | 2004-038548 | 2/2004 |

* cited by examiner

| SENDING USER ID | RECEIVING USER ID |
|---|---|
| USER ID 1 | USER ID 2 |
| USER ID 1 | USER ID 2 |
| USER ID 1 | USER ID 4 |
| USER ID 2 | USER ID 1 |
| USER ID 2 | USER ID 3 |
| USER ID 2 | USER ID 4 |
| USER ID 3 | USER ID 4 |
| USER ID 3 | . . . |
| USER ID 3 | . . . |
| . . . | . . . |

| PRODUCT USER | a | b | c | d | e | f | g | DIFFERENCE | DISTANCE |
|---|---|---|---|---|---|---|---|---|---|
| USER A | 1 | 0 | 1 | 1 | 0 | 0 | 0 | N/A | N/A |
| USER B | 1 | 0 | 1 | ✗ | 0 | ✗ | ✗ | 3 | 1.73 |
| USER C | 1 | 0 | 1 | 1 | 0 | 0 | ✗ | 1 | 1.00 |
| USER D | ✗ | 0 | 1 | ✗ | 0 | ✗ | ✗ | 4 | 2.00 |
| USER E | ✗ | ✗ | ✗ | ✗ | ✗ | ✗ | ✗ | 7 | 2.65 |

FIG. 7

| USER ID | TARGET USER ID | SIMILARITY DISTANCE |
|---|---|---|
| USER ID 1 | USER ID 2 | 3.0 |
| USER ID 1 | USER ID 3 | 4.0 |
| USER ID 1 | USER ID 4 | 2.5 |
| . . . | . . . | . . . |
| USER ID 2 | USER ID 1 | 3.0 |
| USER ID 2 | USER ID 3 | 3.5 |
| USER ID 2 | USER ID 4 | 4.5 |
| . . . | . . . | . . . |
| USER ID 3 | USER ID 4 | 1.5 |
| . . . | . . . | . . . |

PROVIDING INFORMATION VIA A NETWORK

FIELD OF THE INVENTION

The present invention relates to a system and method for effectively communicating recommended information on purchase of products or use of services via a computer network.

BACKGROUND ART

As computer networks have spread, electronic commerce or e-commerce has been widely used. Many Web sites providing e-commerce services provide users visiting their sites (site users) with recommended information on products or services on Web pages. The sites may also provide recommended information by delivering e-mails describing the recommended information on products or services to registered members.

Heretofore, this type of recommended information was generated on the basis of product purchase histories or service use histories of site users. As a simple example, if two or more site users have purchased the same product, each of these site users may be presented information on a different product purchased by another or the other site users. Another example for providing site users with more accurate information is described in Japanese Published Patent Application 2001-229285, in which site users are divided into groups on the basis of their product purchase trends, and recommended information is generated on the basis of histories of selling products to each group and communicated to members of that group. In this case, various statistical analysis methods including data mining may be used to generate recommended information from histories of selling to that group. In the method of generating recommended information on the basis of product purchase histories or service use histories of site users, it is possible to provide recommended information on products or services which are expected to be wanted by the site users by determining site users' preferences through the product purchase histories or the service use histories.

Also, recommended information is provided by a campaign for advertising products or services, or information on products relating to a product which an intending purchaser wants to purchase is provided to the intending purchaser. The recommended information is generated according to provider's hope, that is, what kind of products or services the provider wants to provide.

As stated above, since the generation of recommended information to be provided via a network needs product sales histories or service use histories, it is often performed in batch processing after storing such history information. In other words, recommended information on a certain product cannot be provided until the product and related products have been sold and a certain amount of data has been stored. For this reason, recommended information on a new product or service can be provided to users only after a certain period of time has passed.

Furthermore, in the prior art, since recommended information is generated on the basis of product sales histories or service use histories, there is a need for information management of product sales histories and service use histories at a site providing products or services. Therefore, a load on a server increases.

Still further, generating and providing recommended information on all of sold products and used services leads to providing site users with a huge volume of recommended information, which is impractical.

If information on a specific product (for example, a campaign product) is provided intentionally as recommended information, the recommended information is generated independently of product sales histories or service use histories, thereby reducing a time delay or load on a server in information management. However, since it is based on a provider's intention to provide which product or service information to which user, site users' preferences, tastes, attributes, and other user trends cannot be reflected on the recommended information and thus it is not always provided to appropriate users (potential customers likely to purchase the product or to use the service).

SUMMARY OF THE INVENTION

Therefore, it is an object of the present invention to provide a method and system for providing recommended information on products or services efficiently and promptly, taking site users' preferences, interests, and other user trends into consideration.

It is another object of the present invention to reduce a load on a server by generating recommended information without using product sales histories or service use histories when providing the recommended information.

To achieve the above and other objects, the present invention is implemented as a system comprising a server for managing information on users and a user terminal used when a user accesses the server via a network. The server includes a table storing association information in which a first user is associated with at least one second user based on a pre-computed similarity among the users and the second user is set as a virtual user (doppelganger) of the first user, and sending means for specifying the first user (target user) associated with the second user based on the association information stored in the table and sending recommended information on event information to a user terminal of the specified first user, in response to receiving the event information, which is information on an activity on the network conducted by the second user.

More specifically, the similarity is computed for each of the plurality of users and the association information is stored in the table as transmission network information for specifying a channel for transmitting information between the plurality of user terminals. The similarity is computed based on previously collected information on user trends of the plurality of users. The user trends may include information on product purchase histories or service use histories of the users, or information on preferences, interests, or attributes of the users.

Furthermore, the foregoing sending means may acquire product purchase information or service use information of the second user as the event information and send the product purchase information or the service use information as the recommended information to the user terminal of the first user.

The foregoing system may further comprise history management means for managing histories of the recommended information sent to the first user. In this case, the sending means may reference the histories managed by the history management means upon acquiring the event information of the second user, and determine not to send the recommended information if the recommended information corresponding to the event information has already been sent to the first user.

The present invention may also be implemented as a method of providing a plurality of users with recommended information from a computer connected to a network via a plurality of user terminals connected to the network. This method comprises the steps of previously storing user information in a database, the user information being information on the plurality of users, computing a similarity between the users based on the user information, storing association information in a table in which a first user is associated with at least one second user based on the similarity and the second user is set as a virtual user of the first user, receiving event information which is information on an activity on the network conducted by the second user, specifying the first user associated with the second user based on the association information stored in the table, in response to the reception of the event information, and sending recommended information on the event information to a user terminal of the specified first user.

According to the present invention having the above configuration, if an event occurs at a site user, other site users can be provided with recommended information efficiently and promptly on the basis of association information (transmission network information) previously generated so as to reflect user trends such as users' preferences, interests, or attributes (may include sex, family make-up, etc.).

Also, according to the present invention, there is no need to use product sales histories or service use histories to generate recommended information, thereby reducing load on a server.

BRIEF DESCRIPTION OF THE DRAWINGS

FIG. 7 is a table which shows a comparison of product purchase conditions of a plurality of users for computing similarities between users.

FIG. 8 shows an example of an inter-user distance table generated by a similarity computing section in the embodiment.

BEST MODE FOR CARRYING OUT THE INVENTION

The presently preferred mode for carrying out the present invention (hereinafter referred to as embodiment) will now be described in detail with reference to the accompanying drawings.

Figure 1:
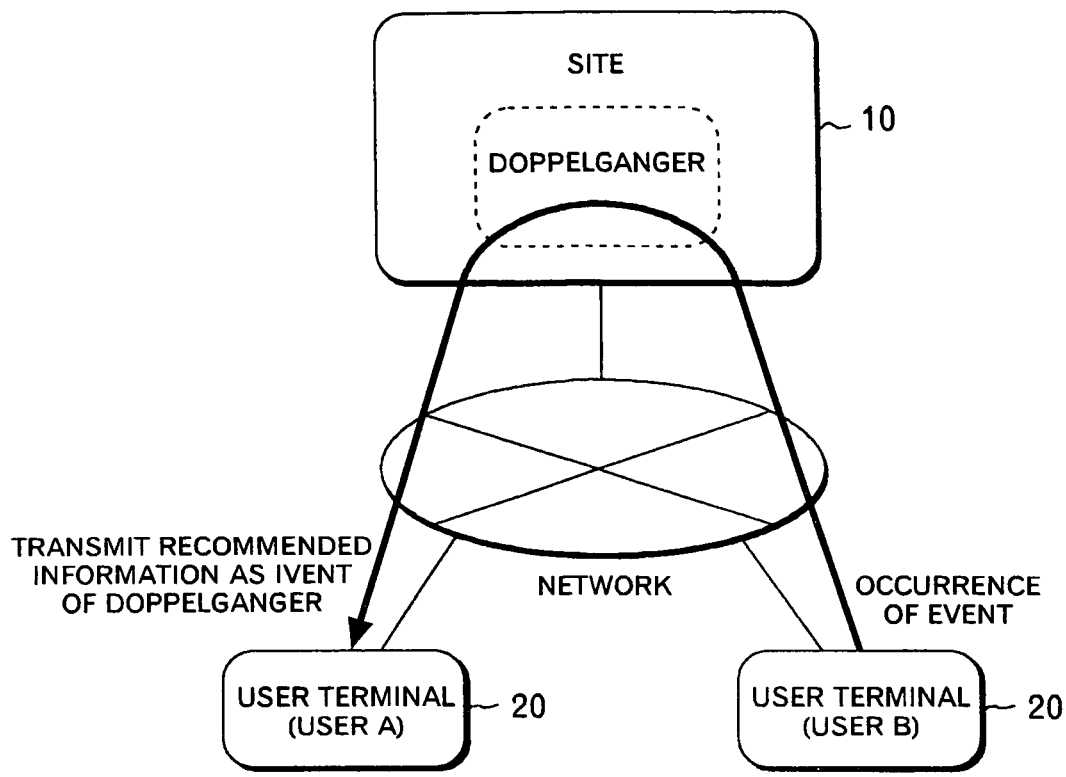
FIG. 1 is a block diagram which illustrates a concept of a recommended information providing system according to the embodiment.

Referring to FIG. 1, there is shown a diagram illustrating a concept of a recommended information providing system according to the embodiment.

As shown in FIG. 1, the system of this embodiment comprises a Web site 10 (hereinafter referred to as site 10) for offering a recommended information providing service and a user terminal 20 of a site user to be provided with recommended information on products or services under the control of the site. In FIG. 1, users A and B are shown as participants in the system of this embodiment. Practically, the site 10 shown in FIG. 1 is implemented as a server machine connected to a computer network. The user terminal 20 is implemented as a client machine used by each site user and is capable of accessing the server machine making the site 10 via the computer network. The site 10 provides the recommended information providing service. The user terminal 20 may be implemented by a personal computer connected to a computer network, a personal digital assistant (PDA), a mobile phone, or any other information terminal having a network function.

For each site user, the server offering the recommended information providing service according to this embodiment sets a virtual user as the other self of that site user on the network. The virtual user is hereinafter referred to as a doppelganger and the site user who is a target of setting the doppelganger is referred to as a target user. The doppelganger is another site user whose preference, interest, product purchase trend, service use trend, or the like is similar to that of the target user. More specifically, while a substance of the doppelganger is another site user similar in user trend to the target user, the target user recognizes it as the other self of the target user. The site user set as a doppelganger for the target user is not limited to one, but a plurality of site users can be set. In this case, however, the target user recognizes it as a single doppelganger, too. Furthermore, the target user and the doppelganger can be set not only in one direction, but also mutually. For example, in FIG. 1, the user A is a target user and the user B is a doppelganger, but on the contrary if the user B is assumed a target user, the user A can be a doppelganger.

In this embodiment, recommended information is provided in an event-driven manner by using a doppelganger set as described above. More specifically, when a site user set as a doppelganger of a certain target user causes an event such as purchasing some product or using a service, the event triggers providing the target user with information on the purchased product or the used service as recommended information. If a plurality of site users are set as doppelgangers, recommended information is generated and transmitted to the target user when one of the site users has purchased a product or used a service. The recommended information does not include private information of the site user who caused the event, and it is transmitted just as an event of the doppelganger of the target user.

Figure 2:
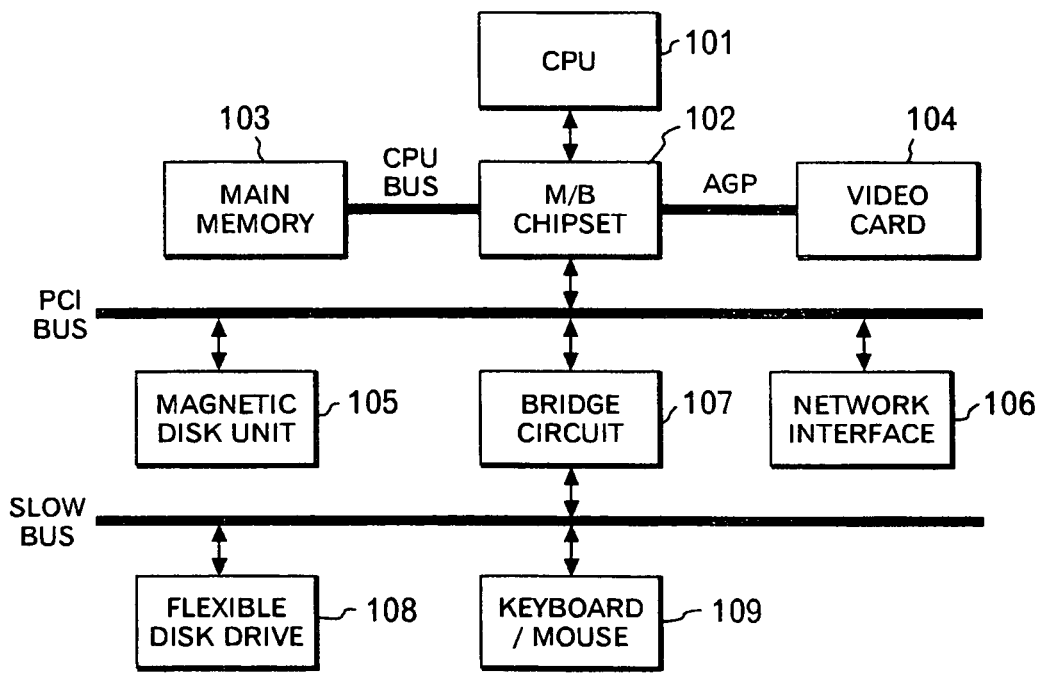
FIG. 2 is a block diagram which schematically shows an example of a hardware configuration of a computer system preferable as a recommended information providing server forming a site shown in FIG. 1.

Referring to FIG. 2, there is shown a diagram schematically illustrating an example of a hardware configuration of a computer system preferable as a server for providing recommended information, which makes the site 10 in FIG. 1.

The computer system shown in FIG. 2 comprises a central processing unit (CPU) 101 as computation means, a main memory 103 connected to the CPU 101 via a motherboard (M/B) chipset 102 and a CPU bus, a video card 104 also connected to the CPU 101 via the M/B chipset 102 and an accelerated graphics port (AGP), a magnetic disk unit (HDD) 105 connected to the M/B chipset 102 via a peripheral component interconnect (PCI) bus, a network interface 106, and a flexible disk drive 108 and a keyboard/mouse 109 connected to the M/B chipset 102 from the PCI bus via a bridge circuit 107 and a slow bus such as an industry standard architecture (ISA) bus.

Note that FIG. 2 only illustrates a hardware configuration of the computer system for implementing the embodiment to which various changes can be made within the scope of the present invention. For example, there can be an arrangement in which only a video memory is mounted instead of providing the video card 104 and the CPU 101 processes image data. Also, a compact disc recordable (CD-R) or digital versatile disc random access memory (DVD-RAM) drive can be provided as an external storage device via an interface such as an AT attachment (ATA) or small computer system interface (SCSI).

Figure 3:
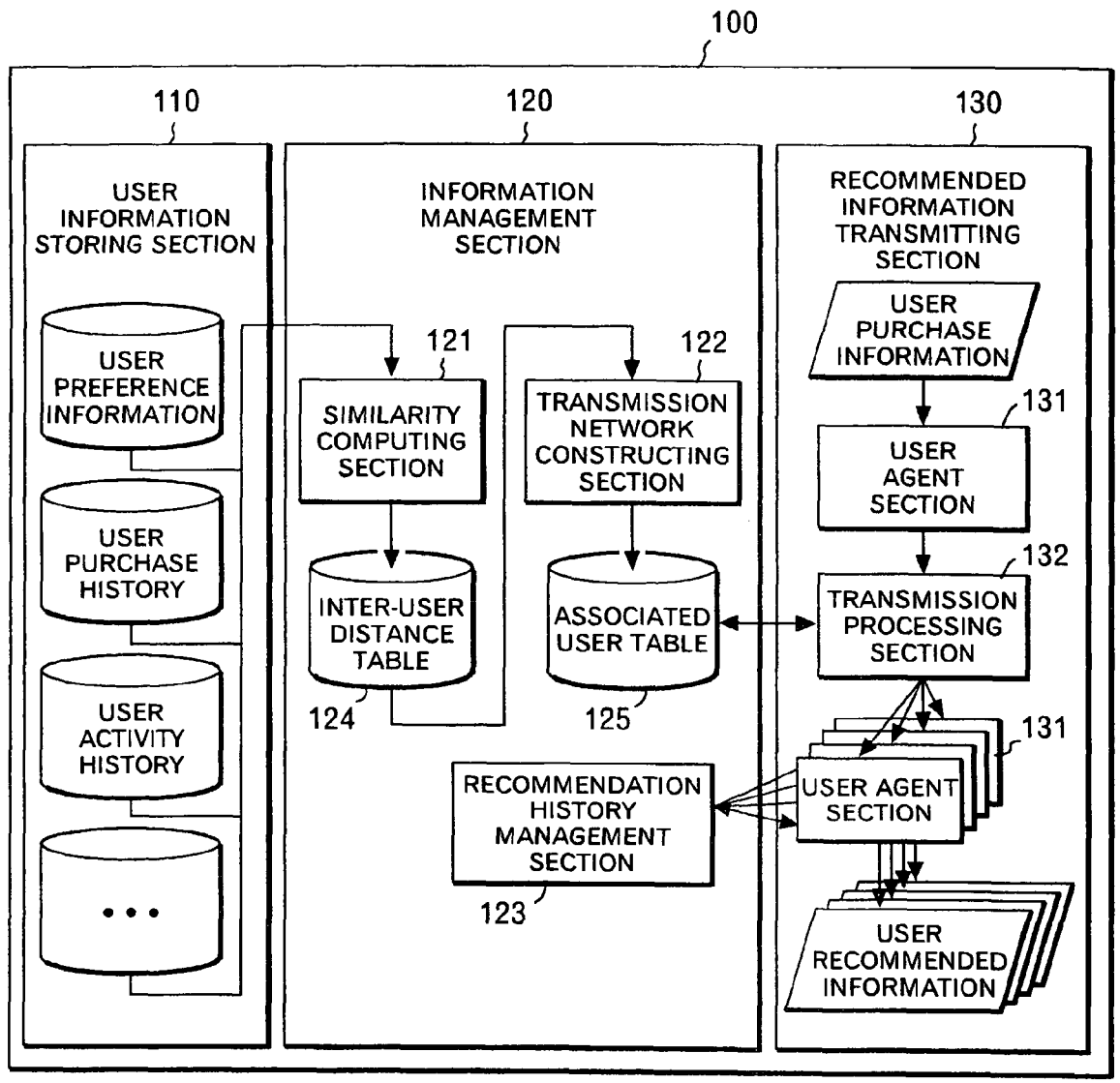
FIG. 3 is a block diagram which shows a functional configuration of the recommended information providing server according to the embodiment.

FIG. 3 illustrates a functional configuration of the recommended information providing server according to this embodiment.

Referring to FIG. 3, the recommended information providing server 100 includes a user information storing section 110 for storing information on site users, an information management section 120 for constructing and managing a network of users based on the information stored in the user information storing section 110, and a recommended information transmitting section 130 for generating recommended information and transmitting the recommended information to the users by using the network managed by the information management section 120.

The user information storing section 110 may be implemented by, for example, the magnetic disk unit 105 or the main memory 103 of the computer system shown in FIG. 2. The user information storing section 110 stores information on users' preferences (e.g., favorite music category), interests (e.g., stock investment), and attributes (e.g., sex, age, family, occupation, and annual income), which have been previously collected by means of questionnaires or the like, and information on users' purchase histories, service use histories, and other user trends, which form a database. An operator or system administrator of the site 10 can arbitrarily determine what kind of information or histories should be stored in the user information storing section 110.

The information management section 120 may be implemented by the program controlled CPU 101 and the main memory 103 of the computer system shown in FIG. 2. As shown in FIG. 3, the information management section 120 includes a similarity computing section 121, a transmission network constructing section 122, and a recommendation history management section 123.

The similarity computing section 121 computes similarities between users on the basis of the information stored in the user information storing section 110. In this embodiment, the user similarity is represented by a distance between relevant users. The similarity computing section 121 generates an inter-user distance table 124 according to the computed similarities (distances) between users and stores it into storage means such as the main memory 103 or the magnetic disk unit 105 shown in FIG. 2.

The similarities can be computed or evaluated by any existing algorithm. For example, assuming two pieces of data x and y each having a variable n:

$$x=[x_1\ x_2\ \text{---}\ x_n]^T$$

$$y=[y_1\ y_2\ \text{---}\ y_n]^T$$

a distance d between x and y can be defined as follows:

Euclidean distance: $d^2 = S(x_i - y_i)^2$

Weighted Euclidean distance: $d^2 = Sw_i(x_i - y_i)^2$

Mahalanobis distance: $d^2 = (x-y)^T C^{-1}(x-y)$

C: Covariance matrix where i=1, 2, - - - , n. The above distance (similarity) definitions are exemplary only and other definitions can be used.

The transmission network constructing section 122 constructs a transmission network for providing users with recommended information on the basis of the inter-user distance table 124 generated by the similarity computing section 121.

Figures 4, 5:
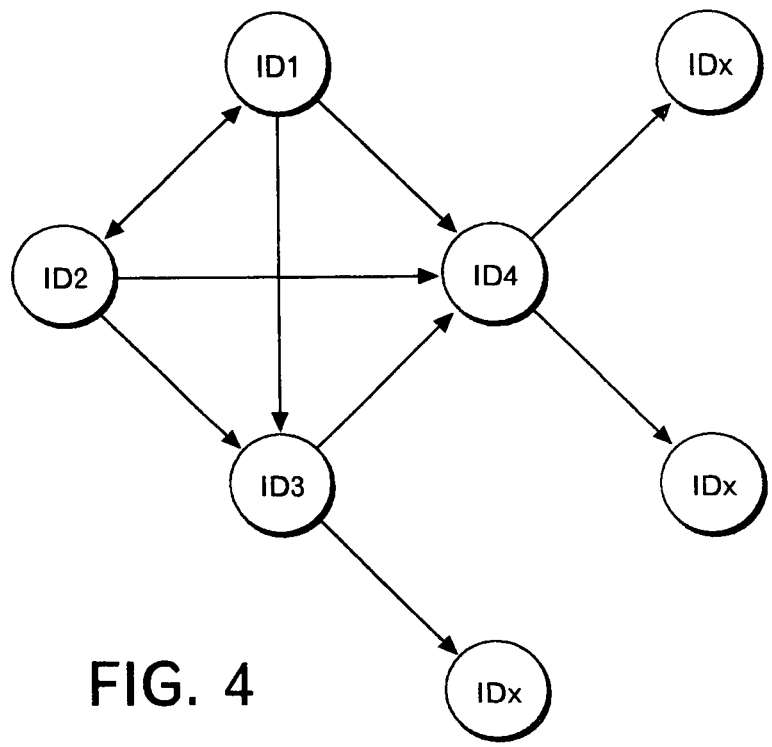
FIG. 4 is a connection diagram which shows a concept of a transmission network constructed by a transmission network constructing section in the embodiment.
FIG. 5 shows an associated user table for the transmission network shown in FIG. 4.

Referring to FIG. 4, there is shown a diagram illustrating a concept of the transmission network constructed by the transmission network constructing section 122.

In FIG. 4, users (nodes) having user IDs 1-4, respectively, are connected to each other. These users are listed in the inter-user distance table 124 as having inter-user distances less than or equal to a predetermined value (i.e., having high similarities). For example, if an event such as a product purchase occurs in the ID 1 user in this transmission network, recommended information according to the event is transmitted to the ID 2, ID 3, and ID 4 users. In the same manner, if an event occurs in the ID 2 user, recommended information according to the event is transmitted to the ID 1, ID 3, and ID 4 users. Focusing on the ID 3 user, if events occur in the ID 1 and ID 2 users, the ID 3 user receives recommended information according to the events, in which the ID 1 and ID 2 users are doppelgangers for the ID 3 user. Similarly, the ID 1, ID 2, and ID 3 users are doppelgangers for the ID 4 user. Further, the ID 1 and ID 2 users are doppelgangers for each other.

Focusing on connections between individual nodes, the transmission network constructed by the transmission network constructing section 122 can be thought to be accumulation of associations between a sending user (node) generating an event such as product purchase or service use and sending event information and a receiving user (node) receiving recommended information based on the event information (that is, the transmission network constructing section 122 is a means for generating association information between the sending and receiving users). Accordingly, the transmission network is stored and retained in a storage means such as the main memory 103 or the magnetic disk unit 105 shown in FIG. 2 in a form of an associated user table 125 in which a user ID of a sending user is associated with a user ID of a receiving user with the sending and receiving users being on a channel for transmitting recommended information.

FIG. 5 shows the associated user table 125 for the transmission network.

Along with transmission of recommended information performed by the recommended information transmitting section 130, the recommendation history management section 123 manages a history of the transmission for each destination user. As shown in FIGS. 4 and 5, focusing on a given user among users forming the transmission network (i.e., registered in the associated user table 125), that user may receive recommended information generated for a plurality of users. For example, the ID 3 user may receive information on the ID 1 user and information on the ID 2 user. In this case, when the ID 1 and ID 2 users have purchased the same product, the ID 3 user receives recommended information having the same contents based on the purchases (events) of the users. Accordingly, when recommended information is transmitted to a user, its history is stored, so that transmission of the same recommended information is prevented by checking the history when new recommended information is generated.

Returning to FIG. 3, the recommended information transmitting section 130, which is a means for transmitting recommended information, is implemented by, for example, the program controlled CPU 101 and the main memory 103 or other storage means of the computer system shown in FIG. 2. The recommended information transmitting section 130 includes a user agent section 131 for sending and receiving information to and from the user terminal 20 in FIG. 1 and a transmission processing section 132 for determining a destination of recommended information according to the transmission network constructed by the transmission network constructing section 122.

The user agent section 131 has a function of a recommended information generating means for receiving product purchase information or service use information, generating recommended information, and providing it to the transmission processing section 132, and a function of a recommended information sending means for sending the recommended information to the associated user terminal 20. In this regard, each user agent section 131 can acquire the product purchase information or the service use information directly from the associated user terminal 20, or from an existing management system such as a customer relationship management (CRM) system.

When the user agent section 131 accepts a request for transmitting recommended information from the transmission processing section 132, it references recommendation histories (transmission histories) managed by the recommendation history management section 123 of the information management section 120. If recommended information for recommending the same object (product or service) has already been sent, the user agent section 131 can determine not to send the recommended information. This prevents the same recommended information from being sent, as described above.

Upon receiving the recommended information from the user agent section 131, the transmission processing section 132 references the associated user table 125 generated by the transmission network constructing section 122 to retrieve a record in which a user agent section 131 that has generated the recommended information is registered as a sending user. It then provides the recommended information to a user agent section 131 corresponding to a receiving user in this record and requests it to transmit the recommended information to a user terminal 20 of the receiving user.

Next, an operation for transmitting recommended information in the above system will be described.

Figure 6:
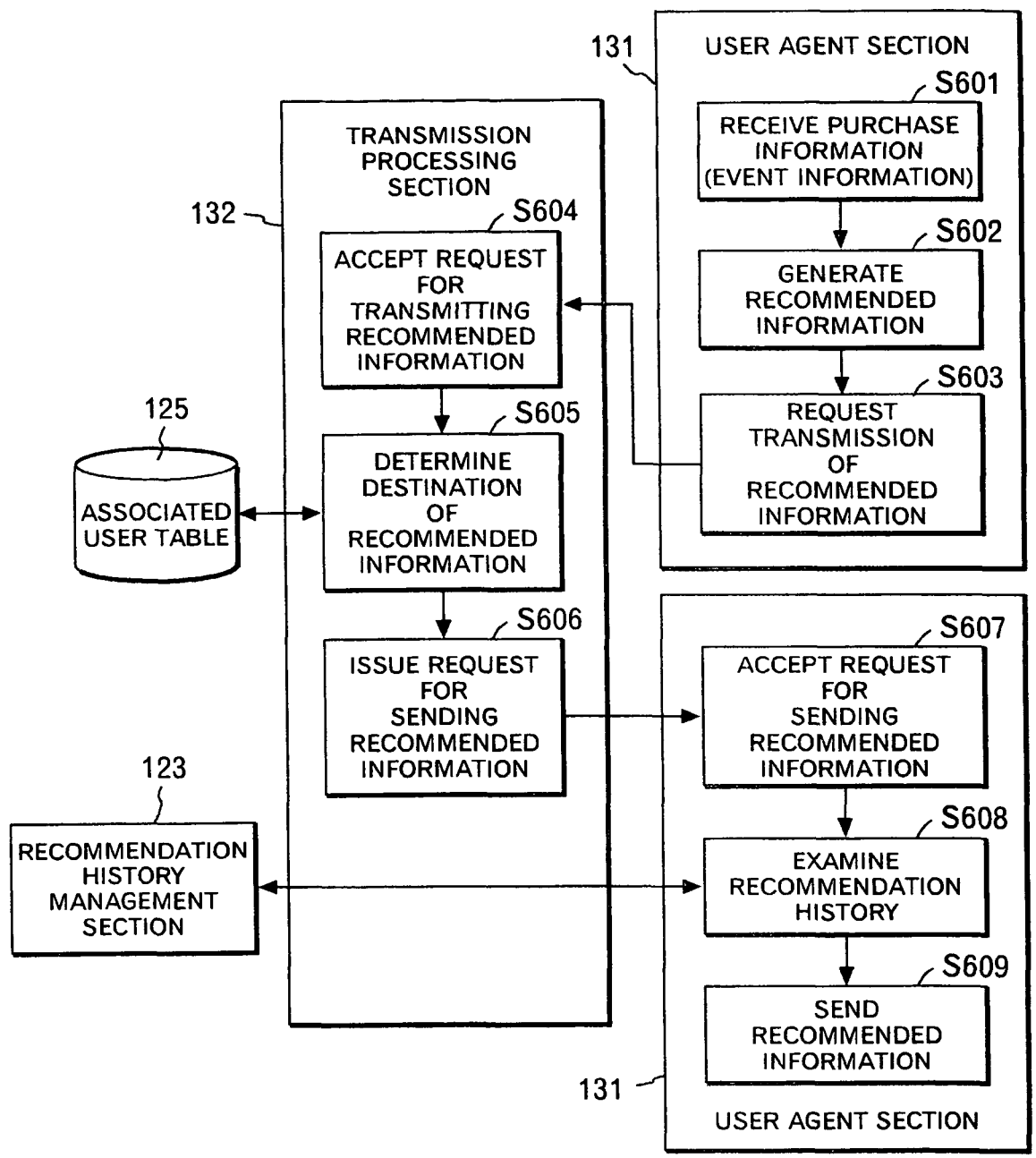
FIG. 6 is a block diagram which illustrates a processing flow of recommended information generation and transmission performed by a recommended information transmitting section of the recommended information providing server in the embodiment.

Referring to FIG. 6, there is shown a diagram illustrating a processing flow in which the recommended information transmitting section 130 of the recommended information providing server 100 generates and transmits recommended information.

First, a given user agent section 131 acquires event information indicating that a user corresponding to the user agent section 131 has purchased a product (S601). The user agent section 131 generates recommended information on the basis of the content of the user's purchase (S602) and requests the transmission processing section 132 to transmit the recommended information (S603). In this regard, the recommended information may include user identification information (e.g., user ID described above), information on a purchased product, and a date of purchase.

Upon accepting the request for transmitting the recommended information from the user agent section 131 (S604), the transmission processing section 132 determines a destination of the recommended information by referencing the associated user table 125 (S605). For example, if the user agent section 131 that has issued the request for transmitting the recommended information corresponds to the ID 1 user in FIG. 4, there are three records in the associated user table 125 in FIG. 5 in which a sending user is the ID 1 user and receiving users are the ID 2, ID 3, and ID 4 users, respectively. Therefore, users having the ID 2, ID 3, and ID 4, respectively, are determined to be the destinations of the recommended information. After determining the destinations of the recommended information, the transmission processing section 132 requests a user agent section 131 corresponding to each of the users determined to be the destination (hereinafter referred to as destination user agent section 131) to send the recommended information (S606). In the above example, the request for sending the recommended information is issued to the user agent sections 131 corresponding to the users having the ID 2, ID 3, and ID 4, respectively.

Upon accepting the request for sending the recommended information from the transmission processing section 132 (S607), the destination user agent section 131 references the recommendation history management section 123 of the information management section 120. Then, the destination user agent section 131 examines whether recommended information for the same object (product or service) has already been sent to a user terminal 20 of a corresponding user (S608). If the recommended information for the same object has already been sent, the user agent section 131 does not send that recommended information. On the other hand, if the recommended information for the same object has not been sent, the user agent section 131 sends the recommended information (S609). In this regard, the recommended information sent from the user agent section 131 to the user terminal (client machine) does not include private information such as identification information of a user having caused an event since the private information is deleted from the recommended information generated in S602. Then, the recommended information on the product purchased by a doppelganger of the target user is output to the user terminal that has received the recommended information. Specifically, for example, the following message may be output: "Dear xxx (target user name): Your doppelganger has purchased *** (product name). Detailed information is as follows: - - - ."

While the above operation assumes a case as an event where a given user has purchased a given product, recommended information may be transmitted by the same operation when a given service has been used.

As described above, if a site user who is a doppelganger of a target user causes an event such as a product purchase or service use, the target user receives recommended information including the content (purchased product or used service) according to the event. Since the target user is immediately specified according to an activity of the site user who is a doppelganger, the recommended information is transmitted to the target user promptly without waiting until product sales histories or service use histories are stored to a certain amount. Also, since the content of the recommended information is determined based on an activity of a site user who is a doppelganger (a product purchased or a service used by the site user is to be recommended), there is no need to use product sales histories or service use histories to generate the recommended information and thus load on the recommended information providing server 100 can be reduced.

As described above, the transmission network is previously generated based on similarities between users and a destination of recommended information is determined based on the transmission network in this embodiment. A method of automatically computing the similarities between users will now be described in more detail below.

FIG. 7 is a diagram showing a comparison of product purchase conditions of a plurality of users for computing the similarities between users.

FIG. 7 shows a relationship between five site users (A to E) and seven products (a to g), indicating which user has purchased (or not purchased) which product. A value 0 is set for a purchased product and a value 1 is set for a product not purchased. Furthermore, on the basis of a purchase condition of the user A, a circle (o) is put on each purchase condition of the users B to E which is the same as the purchase condition of the user A, and a cross (x) is put on each purchase condition of the users B to E which is different from the purchase condition of the user A. For example, regarding the product a, the users A, B, and C have not purchased the product while the users D and E have already purchased it. Therefore, a circle (o) is given for the users B and C having the same condition as the user A while a cross (x) is given for the users D and E having a different condition from the user A.

In the example of FIG. 7, similarities of the users B, C, D, and E to the user A are computed below. It is assumed here that the above Euclidean distance is used as a value indicating a similarity.

The user B is taken first. Representing data of the user A and data of the user B by x=[1011000] and y=[1010011], respectively, $d^2=S(x_i-y_i)^2$ indicates the number of differences between the data of the user A and the data of the user B and its value is 3. Therefore, a value of a distance d indicating the similarity is 1.73. In the same manner, data of the user C has a difference of 1 and a distance d of 1.00; data of the user D has a difference of 4 and a distance of 2.00; and data of the user E has a difference of 7 and a distance d of 2.65.

In the example of FIG. 7, the similarities have been computed on the basis of whether each customer has purchased individual products. If, for example, music compact discs (CDs) are target products, a distance d can be computed using data of the number of purchased products for each category of each purchaser by classifying the products by categories such as specific artists or specific musical styles. Furthermore, like the above weighted Euclidean distance, computation of the distance d may be adjusted by weighting individual items.

In the above example of similarity computation, the similarities are computed on the basis of the product purchase conditions of the users, but initially there are no product purchase histories and service use histories of individual users. In the initial state, for example, information on user trends is previously collected by means of questionnaires or the like at the time of user registration, and differences between users are obtained based on the information to compute the similarities (distances). In the system of this embodiment, recommended information based on an event caused by a given user is transmitted to another user via the transmission network including users as nodes. The site 10 (recommended information providing server 100) which implements the above is in control of the users forming the transmission network by means of member registration. Therefore, initial similarities between users can be computed by collecting information from questionnaires at the time of user registration.

FIG. 8 shows an example of the inter-user distance table 124 generated by the similarity computing section 121 by computing the similarities (distances) between the users as described above.

As shown in FIG. 8, the inter-user distance table 124 contains pairs of two users associated with similarities (distances) between the users computed in the above method, regarding users who have become managed through the member registration. The inter-user distance table 124 can dynamically reflect user purchase trends by generating and updating the entire contents regularly (e.g., once a month) on the basis of purchase histories of the users who are the members as described above. It is also possible to update in real time only a part related to a user whose data has been changed due to an occurrence of an event such as a product purchase, if necessary.

The transmission network constructing section 122 updates the transmission network (associated user table 125) according to the updating of the inter-user distance table 124 generated by the similarity computing section 121 or regularly. This enables an appropriate selection of a doppelganger according to the latest purchase trends of the users.

In this embodiment, users having a higher similarity (shorter distance between users) are mutually connected via the network on the basis of the inter-user distance table 124 generated by the similarity computing section 121. This enables transmission of recommended information between users who have similar user trends such as preferences, product purchase trends, and service use trends. The transmission network constructing section 122 can use parameters such as an information transmission count and an information reception count in each user, and a link level, in addition to the similarity between users, in order to construct a more appropriate transmission network.

In the above, the information transmission count is an amount of feature indicating the number of other users to which information on a certain user is transmitted. Specific parameters to be used may be the minimum transmission count indicating the minimum number of users to which information is transmitted from each user, an average transmission count indicating the average number of users to which information is transmitted from each user, and the maximum transmission count indicating the maximum number of users to which information is transmitted from each user.

On the other hand, the information reception count is an amount of feature indicating the number of other users on which a certain user receives information. Specific parameters may be the minimum reception count indicating the minimum number of users on which each user receives information, an average reception count indicating the average number of users on which each user receives information, and the maximum reception count indicating the maximum number of users on which each user receives information.

The link level is defined as the minimum number of links that need to be disconnected when the network is divided into two parts, which is an amount of feature assuring that the network is not divided even if some links are removed as long as the number of removed links is less than the link level. For example, a circuit network is not divided even if one link is removed, but is divided into two parts if two links are removed. Therefore, it is described as a network of link level 2. If the transmission network is generated based only on similarities between users, a lot of small networks each formed by a small number of nodes (users) with high similarities are generated so that recommended information could not be widely transmitted. Therefore, by setting the link level, a global network connection is assured so as not to keep recommended information in a local small group.

By properly selecting and setting these parameters when constructing a transmission network, it becomes possible to appropriately adjust connecting relations between nodes (users) in the transmission network. Therefore, by setting these parameters according to a specific purpose or principle of operating a system to which this embodiment is applied, an optimum network for transmitting recommended information can be constructed.

A category classification and a cluster classification are known as typical techniques for relating similar nodes with each other in an assembly of a plurality of nodes like the transmission network in the embodiment. In the category classification, the nodes are classified according to an arbitrarily selected variable (in the embodiment, a user's age, occupation, sex, preference information, purchase history, or the like) or a variable correlating closely with recommended information. Unlike the embodiment using similarities, however, profiles of categories are uniformly determined and therefore optimum classification is not always achieved. In the cluster classification, nodes a short distance away from each other (with high similarities) are collected and classified into a cluster, according to distances indicating similarities. An attribute of a cluster, however, is an average of attributes of elements (nodes) included in the cluster. Therefore, focusing on individual nodes, the attribute of the cluster is not always appropriate as an attribute of that node. In either classification, seen from individual nodes classified into a given category or cluster, there is a possibility that a node classified into a different category or cluster has a higher similarity to that node than other nodes classified into the given category or cluster (e.g., a node close to a boundary area between categories or clusters).

On the other hand, according to the transmission network of the embodiment, nodes having higher similarities are connected to each other to construct the network with focusing on individual nodes, thereby preventing the above disadvantages. In other words, if a user causes an event such as a product purchase or a service use, recommended information is reliably transmitted to other users having higher similarities to that user. According to the embodiment, a user that has received the recommended information (target user) may cause a new event (purchases the same product or uses the same service) on the basis of the recommended information, and thus the recommended information may be transmitted like a chain reaction via the transmission network. Therefore, it is possible to transmit recommended information as if word-of-mouth information is spread on the network.

In the above embodiment, if a plurality of site users are preset as a doppelganger for a target user, a control has been made to suppress transmission of recommended information having duplicate contents. Depending on a purpose or principle of operating a system or contents of recommended information, however, the recommended information having duplicate contents may be transmitted, or it may be preferable to readily transmit the recommended information having duplicate contents once it is generated. For example, if a target user knows that a plurality of site users are preset as his/her own doppelganger, the target user learns that the plurality of site users similar to the target user in user trends have purchased an identical product or used an identical service by means of the transmission of the recommended information having duplicate contents. Therefore, it can give the target user further incentive to purchase the product or to use the service. Therefore, in this case, the recommendation history management section 123 of the information management section 120 is not an indispensable component. When accepting a request for transmitting recommended information from the transmission processing section 132, the user agent section 131 immediately sends the recommended information to a corresponding user terminal 20 without referencing the recommendation history management section 123.

Furthermore, the embodiment has been described by giving an example of a case where a product purchase or a service use of a site user is treated as an event and thereby recommended information is provided to other site users. However, according to the system of the embodiment, it is also possible to arbitrarily preset events such as various activities conducted by a site user on a network, including browsing or writing a message into a specific Web page or whether the site user is in a log-on state for the network, and to transmit the activities of that site user to other site users in an event-driven manner. Thus, each of the site users who have received the transmission can know substantially in real time the activities of a doppelganger who cannot be identified but is some other site user similar to that site user in user trends and recognized as the other self of that site user. Therefore, the site user can take new interests in his or her own activities on the network

What is claimed is:

1. A computer hardware system for providing a plurality of users with recommended information via a plurality of user terminals connected to a network, comprising:
   a hardware processor;
   a memory coupled to the hardware processor and on which is maintained a table for storing association information of the plurality of users; and
   a connection mechanism for connecting to the network and plurality of user terminals wherein
   the hardware processor is configured to perform:
      generating and storing the association information in the table, in which a first user is associated with at least one second user based on a pre-computed similarity among the users, and the second user is set as a virtual user of the first user, and the similarity is computed for each of the plurality of users and the association information is stored in the table as transmission network information for specifying a transmission channel for transmitting information between the plurality of user terminals via the network;
      specifying the first user associated with the second user based on the association information stored in the table;
      sending recommended information on event information to a user terminal of the specified first user, in response to receiving the event information on an activity on the network conducted by the second user; and
      managing histories of the recommended information sent to the first user, wherein
   the sending references the managed histories upon acquiring the event information of the second user, and does not send the recommended information if the recommended information corresponding to the event information has already been sent to the first user.

2. The system according to claim 1, wherein
   the similarity is computed based on previously collected information on user trends of the plurality of users.

3. The system according to claim 2, wherein
the user trends include information on product purchase histories or service use histories of the users.

4. The system according to claim 2, wherein
the user trends include information on preferences, interests, or attributes of the users.

5. The system according to claim 1, wherein
the sending acquires product purchase information or service use information of the second user as the event information and sends the product purchase information or the service use information as the recommended information to the user terminal of the first user.

6. A method of providing a plurality of users with recommended information from a computer connected to a network via a plurality of user terminals connected to the network, comprising the steps of:
storing user information in a database, the user information being information on the plurality of users;
computing a similarity between the users based on the user information;
storing association information in a table, in which a first user is associated with at least one second user based on the similarity and the second user is set as a virtual user of the first user;
wherein the storing step includes storing the association information as transmission network information for specifying information transmitting channels between the plurality of user terminals of the plurality of users via the network, based on the similarity previously computed for each of the plurality of users;
receiving event information on an activity on the network conducted by the second user; specifying the first user associated with the second user based on the association information stored in the table, in response to the reception of the event information;
sending recommended information on the event information to a user terminal of the specified first user; and
acquiring a history of the recommended information in the sending step, wherein the sending step does not send the recommended information if equivalent recommended information has already been sent to the user terminal of the first user specified in the specifying step, based on the history acquired in the history acquiring step.

7. The method according to claim 6, wherein
the user information includes information on product purchase histories or service use histories of the users.

8. The method according to claim 6, wherein
the user information includes information on preferences, interests, or attributes of the users.

9. The method according to claim 6, wherein:
the receiving step acquires product purchase information or service use information of the second user as the event information; and
the sending step sends recommended information for recommending the product or the service.

10. A system comprising:
a processing unit;
a memory coupled to the processing unit and on which is maintained a table for storing association information of a plurality of users;
a connection mechanism for connecting to a network and plurality of user terminals;
computer program instructions stored in the memory, said processing unit executing the computer program to generate and store the association information in the table, in which a first user is associated with at least one second user based on a pre-computed similarity among the users, and the second user is a virtual user of the first user;
program instructions stored in the memory, said processing unit executing the computer program instructions to compute the similarity of each of the plurality of users and the association information;
program instructions stored in the memory, said processing unit executing the computer program instructions to detect network activity conducted by the second user;
program instructions stored in the memory, said processing unit executing the computer program instructions to responsive to detecting the network activity, determine the second user is a virtual user of the first user, determine one of the user terminals associated with the first user, and to determine recommended information on an event related to the network activity;
program instructions stored in the memory, said processing unit executing the computer program instructions to send the recommended information on the event to the user terminal of the first user, which occurs in response to the network activity conducted by the second user.

11. The system of claim 10, further comprising:
program instructions stored in the memory, said processing unit executing the computer program instructions to manage history information of recommended information sent to the first user, wherein the program instructions that send the recommended information check the managed history information and only send the recommended information of the event to the user terminal of the first user if the recommended information corresponding to the event information has not been sent to the first user previously.

12. The system according to claim 10, wherein
the similarity is computed based on product purchase histories or service use histories of the first user.

13. The system according to claim 10, wherein
the similarity is computed based on product purchase histories or service use histories of the second user.

14. The system according to claim 10, wherein
the detected network activity is a purchase of a product or service made by the second user.

15. The system of claim 10, wherein
the recommendation information is a recommendation for a for sale product or for-sale service, which is recommended to the first user based on the network activity of the second user.

* * * * *